United States Patent
Voisine et al.

(10) Patent No.: US 11,686,343 B2
(45) Date of Patent: Jun. 27, 2023

(54) SPHERICAL BEARING HAVING AN AXIALLY OFFSET INNER MEMBER

(71) Applicant: Roller Bearing Company of America, Inc., Oxford, CT (US)

(72) Inventors: James Voisine, Burlington, CT (US); Bradley Smith, Glastonbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 17/504,900

(22) Filed: Oct. 19, 2021

(65) Prior Publication Data
US 2022/0136560 A1     May 5, 2022

Related U.S. Application Data

(60) Provisional application No. 63/106,958, filed on Oct. 29, 2020.

(51) Int. Cl.
| | |
|---|---|
| *F16C 23/04* | (2006.01) |
| *F16C 17/10* | (2006.01) |
| *F16C 43/02* | (2006.01) |

(52) U.S. Cl.
CPC .......... *F16C 23/043* (2013.01); *F16C 17/105* (2013.01); *F16C 23/045* (2013.01); *F16C 43/02* (2013.01)

(58) Field of Classification Search
CPC .... F16C 11/06; F16C 11/0614; F16C 17/105; F16C 23/043; F16C 23/045
See application file for complete search history.

(56) References Cited

U.S. PATENT DOCUMENTS

| | | | |
|---|---|---|---|
| 2,158,062 A | | 5/1939 | Blomberg |
| 2,225,951 A | | 12/1940 | Christianson |
| 2,345,564 A | * | 4/1944 | Allen .................... F16C 23/045 |
| | | | 384/208 |
| 3,922,971 A | | 12/1975 | Maroshick |
| 4,089,095 A | * | 5/1978 | Becker ................ F16C 11/0676 |
| | | | 29/898.044 |
| 5,010,614 A | | 4/1991 | Braemert et al. |
| 5,172,819 A | | 12/1992 | Daugherety, Jr. et al. |
| (Continued) | | | |

FOREIGN PATENT DOCUMENTS

| | | |
|---|---|---|
| EP | 2933510 B1 | 3/2017 |
| WO | 0208622 A1 | 1/2002 |

*Primary Examiner* — James Pilkington
(74) *Attorney, Agent, or Firm* — Robinson & Cole LLP (57) ABSTRACT

A spherical bearing includes an inner member that has an exterior surface extending a first width between axial ends thereof and having a first central plane located equidistant between the axial ends. The spherical bearing includes an outer member with a inner surface having a maximum inside diameter at an apex plane and extending a second width between opposing ends thereof and having second central plane located equidistant between the ends thereof. The inner member is disposed in an interior area of the outer member. The first central plane is coplanar with the apex plane and is axially offset from the second central plane. One of the opposing axial ends of the inner member is located entirely in the interior area and axially inward from ends of the outer member when the inner member is angularly misaligned relative to the outer member at non-zero angles up to 7 degrees.

23 Claims, 10 Drawing Sheets

(56) References Cited

U.S. PATENT DOCUMENTS

| | | |
|---|---|---|
| 6,691,883 B1 | 2/2004 | Daugherty, Jr. |
| 8,033,748 B2 | 10/2011 | Krome |
| 10,746,225 B2* | 8/2020 | Karaki .................. C08F 259/08 |
| 11,053,972 B2 | 7/2021 | Paerewyck et al. |
| 2008/0040886 A1* | 2/2008 | Arnold .................... F16C 33/12 |
| | | 384/322 |

* cited by examiner

SPHERICAL BEARING HAVING AN AXIALLY OFFSET INNER MEMBER

CROSS REFERENCE TO RELATED APPLICATIONS

This application claims priority to commonly owned and U.S. Provisional Patent Application Ser. No. 63/106,958 filed Oct. 29, 2020, the entirety of which is incorporated herein by reference.

FIELD OF THE INVENTION

This invention relates to a spherical bearing having an inner member disposed in an outer member such that the inner member is axially offset in the outer member and is more particularly directed to a spherical bearing that can accommodate angular misalignment.

BACKGROUND

Rail cars are typically connected to one another in train that rides on a track. To facilitate passengers' ability to walk between adjacent rail cars a rail car gangway platform is provided between and connected to adjacent rail cars. The gangway platform is typically mounted on a housing that includes a bearing that accommodates angular movement between adjacent rail cars, for example, in a vertical or horizontal direction or combinations thereof. However, the magnitude of the angular movement can be limited by interference between portions of the bearing and the housing.

Thus, there is a need for an improved bearing that addresses the foregoing problems.

SUMMARY

The present invention includes a spherical bearing that has an inner member arranged concentrically about a longitudinal axis thereof and has a spherical exterior surface that faces radially outward away from the longitudinal axis and extends a first width between a first axial end and a second axial end thereof. The inner member has an inner member central plane that is located equidistant between the first axial end and the second axial end. The spherical bearing includes an outer member that has a spherical inner surface that faces radially inward towards the longitudinal axis and extends a second width between a receiving end and a retaining end thereof. The outer member has an outer member central plane that is located equidistant between the receiving end and the retaining end. The spherical inner surface has a maximum inside diameter located at an apex plane and that defines an interior area in which the inner member is disposed. The inner member is located between the receiving end and the retaining end when the inner member is aligned relative to the outer member at a zero angle measured relative to the longitudinal axis. The inner member central plane is coplanar with the apex plane and is axially offset from the outer member central plane towards the retaining end when the inner member is aligned relative to the outer member at a zero angle measured relative to the longitudinal axis. The first axial end of the inner member is located entirely in the interior area and axially inward from the receiving end when the inner member is angularly misaligned relative to the outer member at a non-zero angle (e.g., up to 7 degrees) measured relative to the longitudinal axis.

In some embodiments, the spherical inner surface has a first slot formed therein. The first slot extends radially outward from the spherical inner surface away from the longitudinal axis and extends axially inward from the receiving end, toward the retaining end. The first slot terminates axially between the outer member apex plane and the retaining end. The first slot has a circumferential width that is greater than the first width of the inner member. The spherical inner surface has a second slot formed therein. The second slot extends radially outward from the spherical inner surface, away from the longitudinal axis and extends axially inward from the receiving end, toward the retaining end. The second slot axially terminates between the outer member apex plane and the retaining end. The second slot has the circumferential width and is located opposite the first slot.

In some embodiments, the inner member is removably disposed in the interior area of the outer member through the slot.

In some embodiments, the inner member is made from a composite material and the outer member is made from a metallic material.

In some embodiments, the spherical exterior surface slidingly engages the spherical inner surface.

In some embodiments, a first lubricious liner is secured to the spherical exterior surface. The lubricious liner slidingly engages the spherical inner surface of the outer member.

In some embodiments, the inner member has a bore extending axially therethrough from the first axial end to the second axial end. The bore defines an inner bearing surface. In some embodiments, a second lubricious liner is secured to the inner bearing surface.

In some embodiments, a shaft extending into the bore. The shaft is in axial and/or rotational sliding engagement with the inner bearing surface.

In some embodiments, the shaft extends into the bore and is in axial and/or rotational sliding engagement with the second lubricious line.

The present invention includes an assembly of a spherical bearing and a housing. The housing extends axially from a housing receiving end to a housing retaining end thereof. The housing has a bearing receiving surface extending axially inward from the housing receiving end. The bearing receiving surface faces radially inward toward the longitudinal axis and terminates at an abutment surface that faces axially toward the housing receiving end and formed on a lip extending radially inward from the housing proximate the housing receiving end. The spherical bearing includes an inner member that is arranged concentrically about a longitudinal axis thereof and has a spherical exterior surface that faces radially outward away from the longitudinal axis and extends a first width between a first axial end and a second axial end thereof. The inner member has an inner member central plane located equidistant between the first axial end and the second axial end. The spherical bearing includes an outer member that has a spherical inner surface which faces radially inward towards the longitudinal axis and extends a second width between a receiving end and a retaining end thereof. The outer member has an outer member central plane located equidistant between the receiving end and the retaining end. The spherical inner surface defines an interior area and that has a maximum inside diameter located at an apex plane. The inner member is disposed in the interior area of the outer member between the receiving end and the retaining end when the inner member is aligned relative to the outer member at a zero angle measured relative to the longitudinal axis. The inner member central plane is coplanar with the apex plane and is axially offset from the outer member central plane towards the retaining end when the inner member is aligned relative to the outer member at a zero angle measured relative to the longitudinal axis. The first axial end of the inner member is located entirely in the interior area and axially inward from the receiving end when the inner member is angularly misaligned relative to the outer member at a non-zero angle measured relative to the longitudinal axis. The spherical bearing is positioned in the housing such that the retaining end of the outer member engages the abutment surface and the receiving end of the outer member is coplanar with the bearing receiving end of the housing. The second axial end of the inner member is located entirely in the housing and axially inward from the bearing retaining end of the housing when the inner member is angularly misaligned relative to the outer member at the non-zero angle (e.g., up to 7 degrees) measured relative to the longitudinal axis.

In some embodiments, the spherical inner surface has a first slot formed therein. The first slot extends radially outward from the spherical inner surface away from the longitudinal axis and extends axially inward from the receiving end toward the retaining end and axially terminates between the outer member apex plane and the retaining end. The first slot has a circumferential width that is greater than the first width of the inner member. The spherical inner surface has a second slot formed therein. The second slot extends radially outward from the spherical inner surface away from the longitudinal axis and extends axially inward from the receiving end toward the retaining end and axially terminates between the outer member apex plane and the retaining end. The second slot has the circumferential width and is located opposite the first slot.

In some embodiments, the inner member is removably disposed in the interior area of the outer member through the slot.

In some embodiments, the inner member is made from a composite material and the outer member is made from a metallic material.

In some embodiments, the spherical exterior surface slidingly engages the spherical inner surface.

In some embodiments, the spherical bearing includes a first lubricious liner secured to the spherical inner surface. The first lubricious liner slidingly engaging the spherical outer surface of the inner member.

In some embodiments, the inner member has a bore extending axially therethrough from the first axial end to the second axial end. The bore defines an inner bearing surface.

In some embodiments, the spherical bearing includes a second lubricious liner secured to the inner bearing surface.

In some embodiments, the spherical bearing includes a shaft that extends into the bore. The shaft is in axial and/or rotational sliding engagement with the inner bearing surface.

In some embodiments, the spherical bearing includes a shaft that extends into the bore. The shaft is in axial and/or rotational sliding engagement with the second lubricious liner.

DETAILED DESCRIPTION

Figure 1:
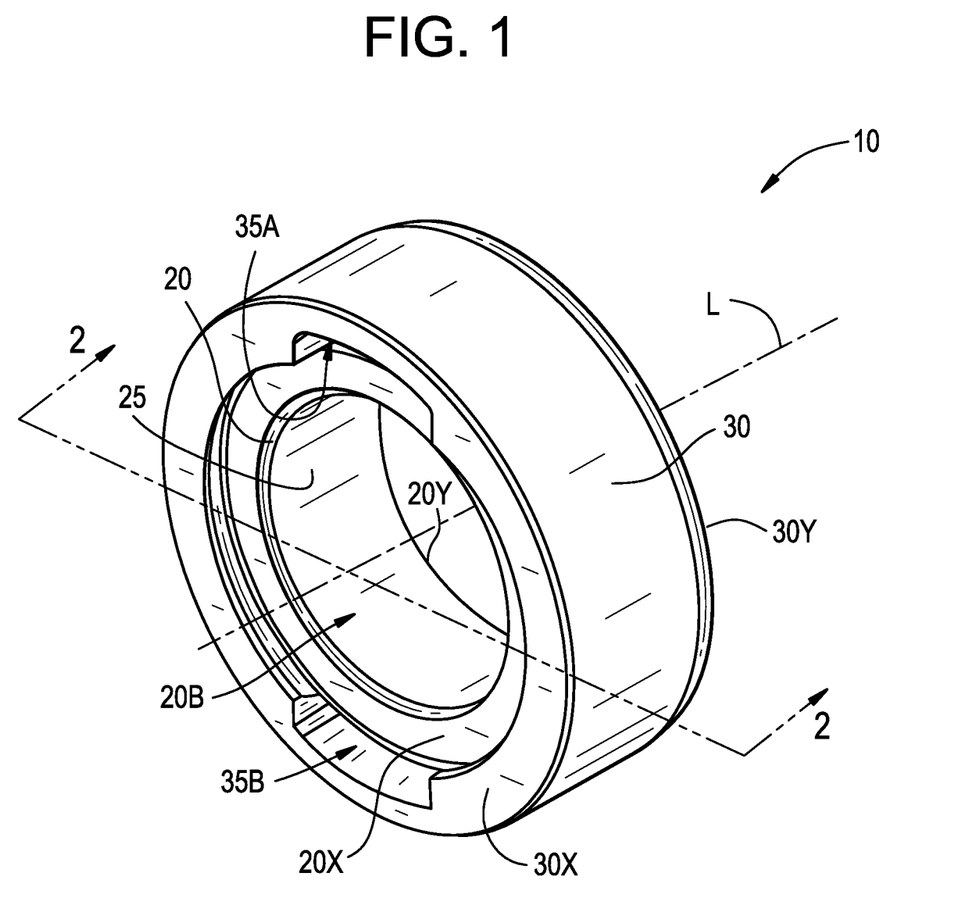
FIG. 1 is a perspective view of a spherical bearing with offset inner member of the present invention.
Figure 2:
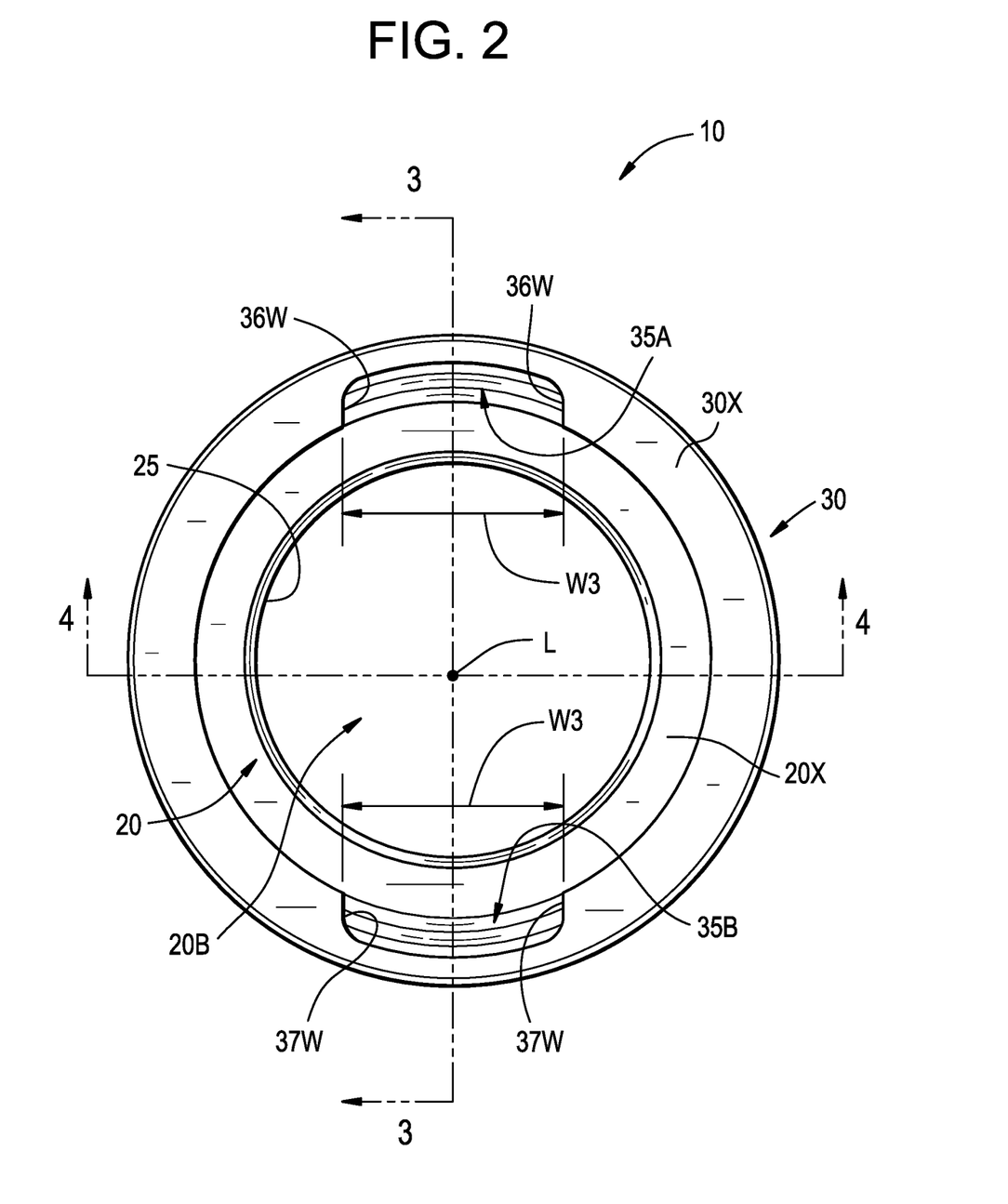
FIG. 2 is an axial side view of the spherical bearing of FIG. 1 taken in the direction of arrows 1-1 of FIG. 1.
Figure 3:
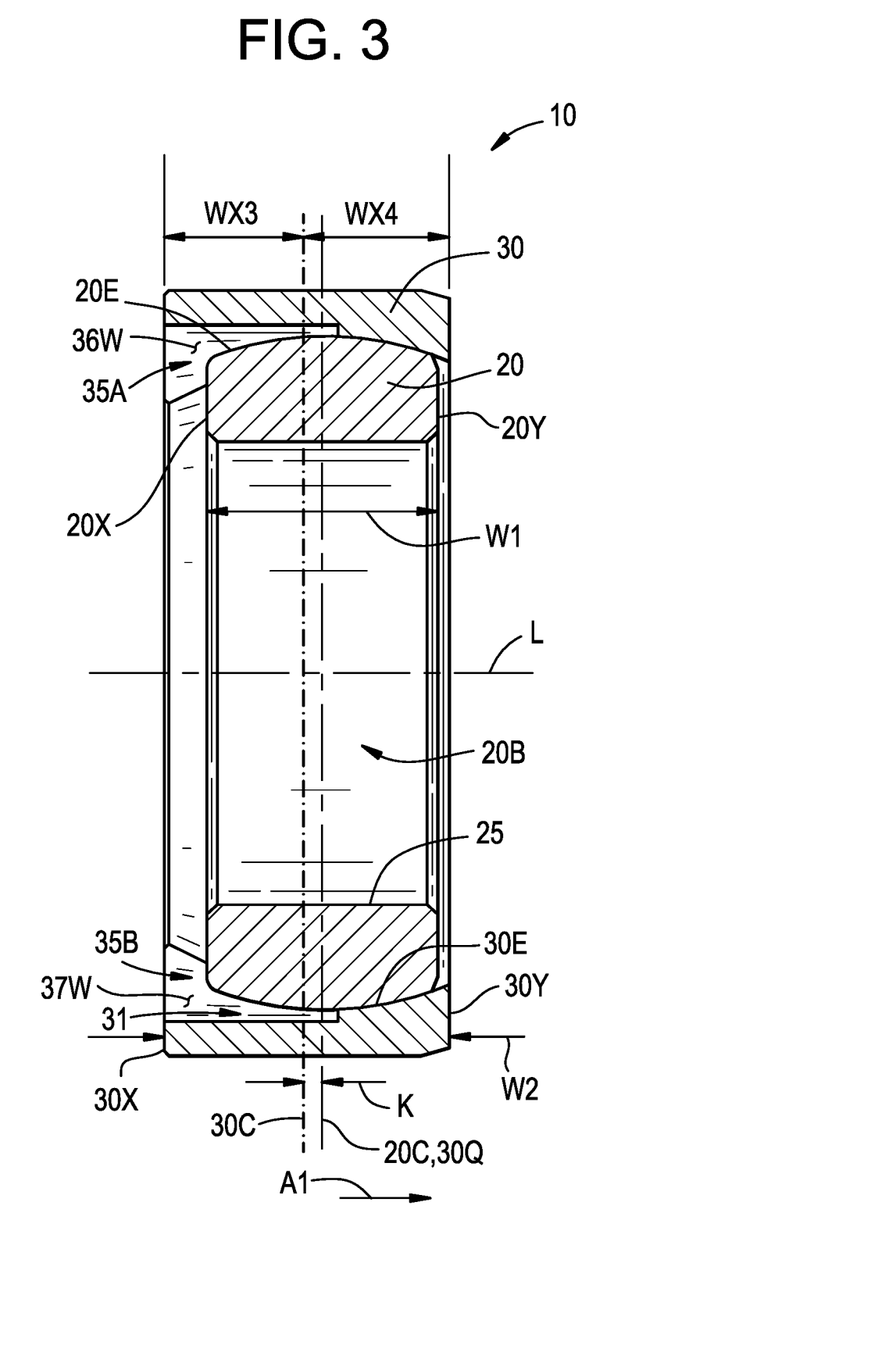
FIG. 3 is a cross sectional view of the spherical bearing of FIG. 2 taken across section 3-3 of FIG. 2.
Figure 4A:
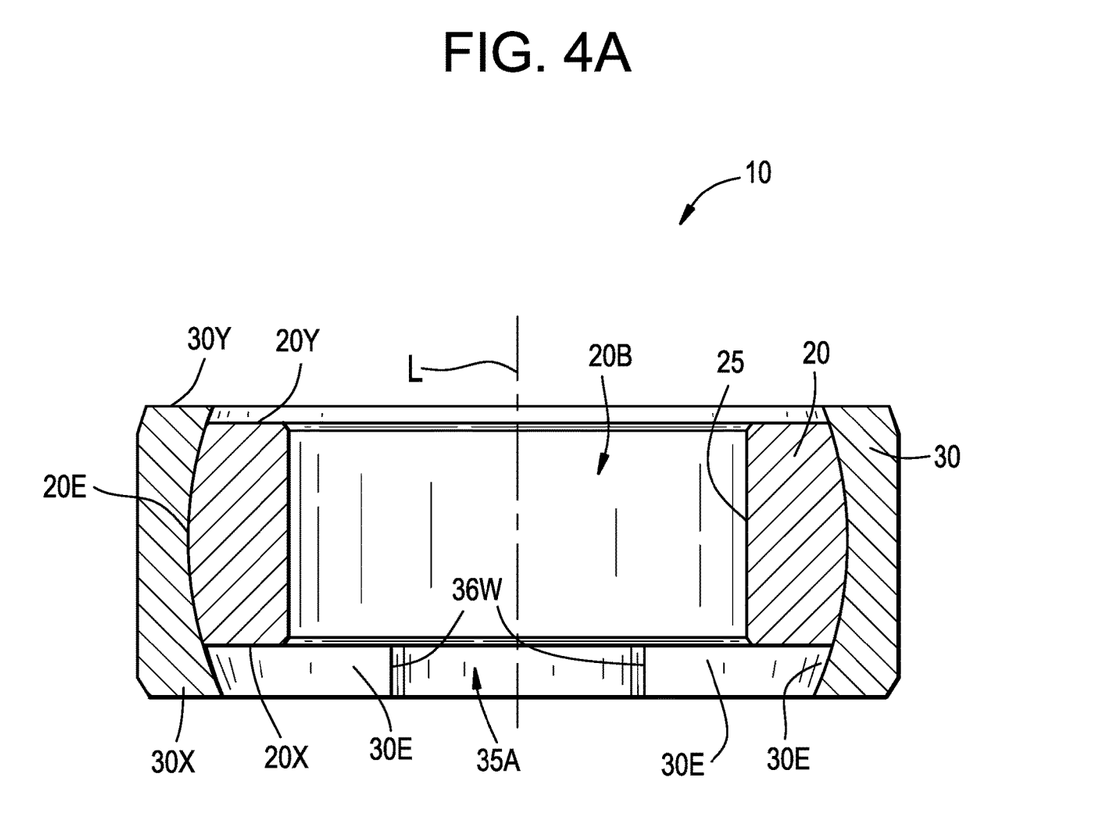
FIG. 4A is a cross sectional view of the spherical bearing of FIG. 2 taken across section 4-4 of FIG. 2.
Figure 4B:
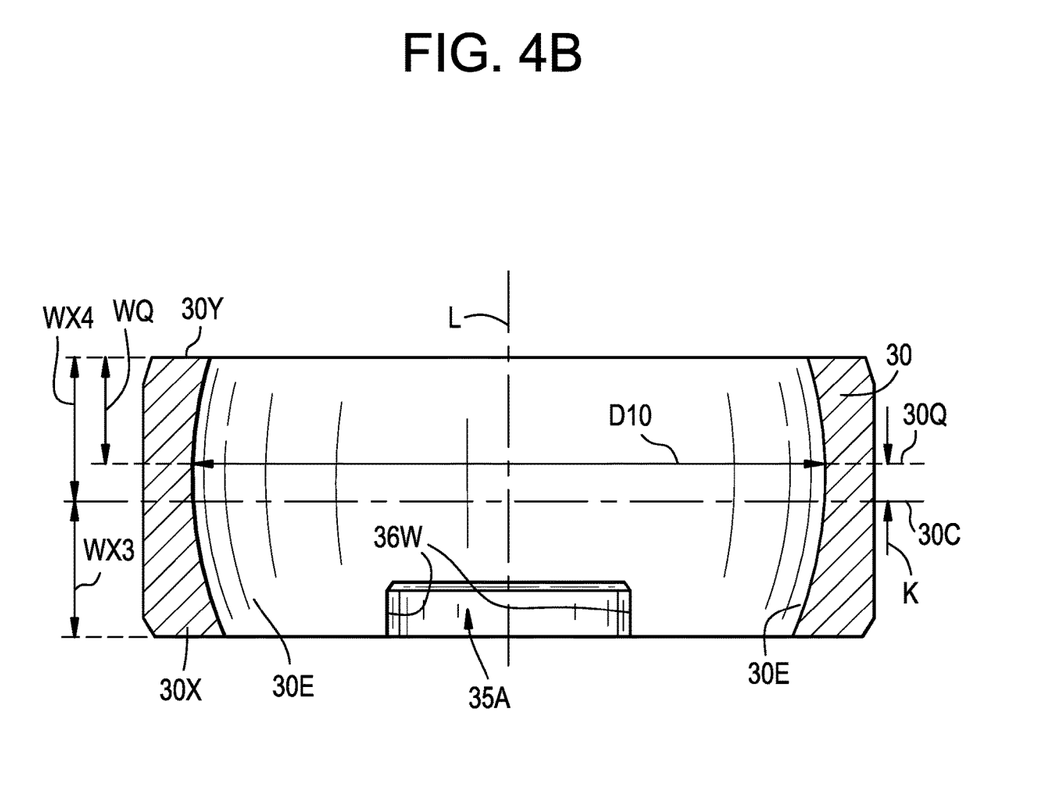
FIG. 4B is a cross sectional view of the outer member of the spherical bearing of FIG. 4A.
Figure 4C:
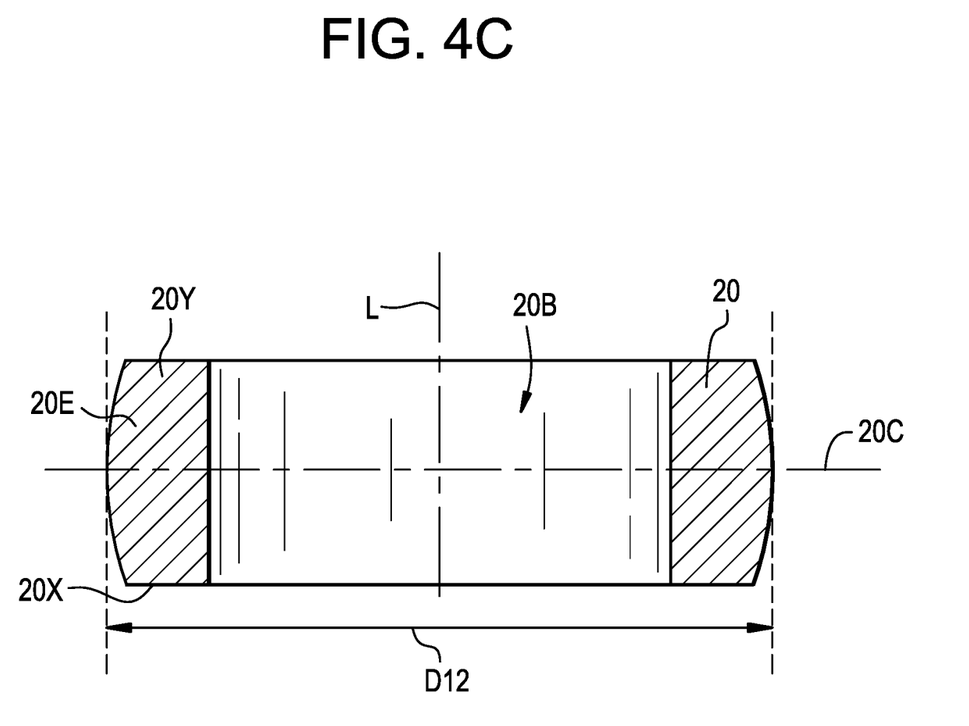
FIG. 4C is a cross sectional view of the inner member of the spherical bearing of FIG. 4A.

As shown in FIGS. 1-4A, a spherical bearing is generally designated by the numeral 10. The spherical bearing 10 includes an inner member 20 arranged concentrically about a longitudinal axis L thereof. As shown on FIG. 3, the inner member 20 is a truncated ball that has a spherical exterior surface 20E that faces radially outward away from the longitudinal axis L and extends a first width W1 between a first axial end 20X and a second axial end 20Y thereof. The inner member 20 has an inner member central plane 20C located equidistant between the first axial end 20X and the second axial end 20Y. The inner member central plane 20C coincides with a location of the maximum outside diameter D12 of the inner member 20 as shown in FIG. 4C As best shown in FIG. 3, the spherical bearing 10 includes an outer member 30 that is generally annular. The outer member 30 has a spherical inner surface 30E that faces radially inward towards the longitudinal axis L and extends a second width W2 between a receiving end 30X and a retaining end 30Y thereof. The outer member 30 has an outer member central plane 30C located equidistant between the receiving end 30X and the retaining end 30Y. As shown in FIG. 4B, the outer member central plane 30C is located an axial distance WX3 from the receiving end 30X and an axial distance WX4 from the retaining end 30Y. The distances WX3 and WX4 are equal in magnitude. The spherical inner surface 30E defines an interior area 31 in which the inner member 20 is disposed. The spherical exterior surface 20E slidingly engages the spherical inner surface 30E. As shown in FIG. 4B, the outer member 30 has a maximum inside diameter D10 at an apex plane 30Q which is located a distance WQ from the receiving end 30Y. The distance WQ is less than the distance WX4.

As shown in FIG. 3 the inner member central plane 20C and the apex plane 30Q are coplanar and axially offset K from the outer member central plane 30C towards the retaining end 30Y in the direction of the arrow A1.

Figure 5:
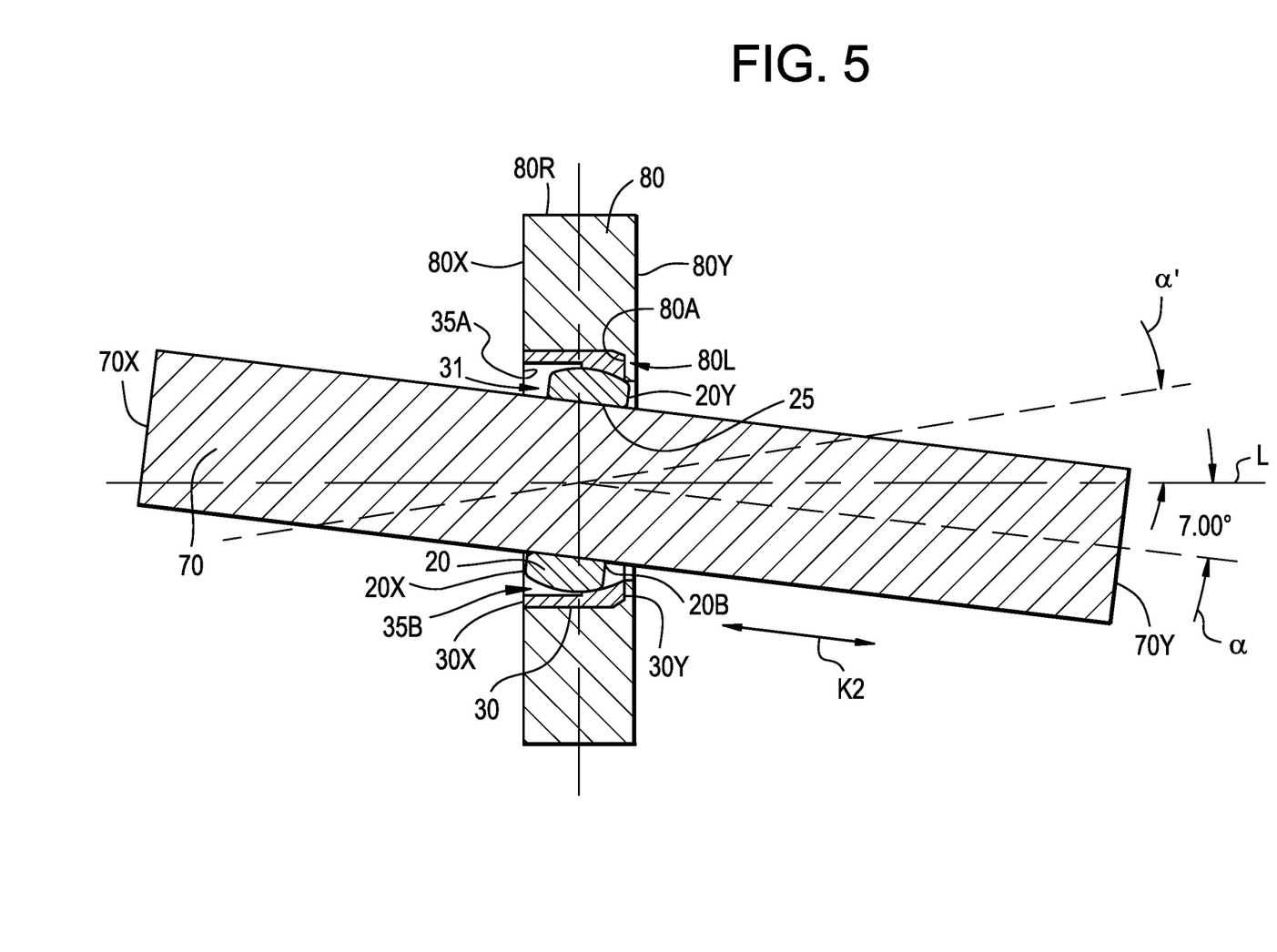
FIG. 5 is a cross sectional view of the spherical bearing of FIGS. 1-4 positioned in a housing and shown with a shaft disposed in the inner member and the inner member and shaft being misaligned relative to an outer member.

As shown in FIG. 5, the first axial end 20X of the inner member 20 is located entirely in the interior area 31 and axially inward from the receiving end 30X when the inner member 20 is angularly misaligned relative to the outer member 30 at angles α, α' up to 7 degrees measured relative to the longitudinal axis L. Thus, the inner member 20 is angularly misalignable relative to the outer member 30 in a conical configuration up to 7 degrees relative to the longitudinal axis L in any direction (e.g., vertical, horizontal and combinations thereof).

In some embodiments, the spherical bearing 10 has a loader slot configuration. For example, as shown in FIGS.

1-4 the spherical inner surface 30E has a first slot 35A formed therein. The first slot 35A extends radially outward from the spherical inner surface 30E away from the longitudinal axis L and extends axially inward from the receiving end 40X toward the retaining end 40Y. The first slot 35A terminates axially between the outer member apex plane 30Q and the retaining end 40Y, and the first slot 35A has a circumferential width W3 that is greater than the first width W1 of the inner member 20. The first slot 35A has opposing side walls 36W that are parallel to the longitudinal axis L (see FIG. 2).

As shown in FIGS. 1-3, the spherical inner surface 30E has a second slot 35B formed therein. The second slot 35B extends radially outward from the spherical inner surface 30E away from the longitudinal axis and extends axially inward from the receiving end 40X toward the retaining end 40Y. The second slot 35B terminates axially between the outer member apex plane 30Q and the retaining end 40Y. The second slot 35B has the circumferential width W3. The second slot 35B is located opposite the first slot 35A. The second slot 35B has opposing side walls 37W that are parallel to the longitudinal axis L (see FIG. 2).

The loader slot configuration of the spherical bearing 10 allows the inner member to be easily installed and replaced without removing the entire spherical bearing 10 from an installed structure and without damaging the outer member 30. For example, the inner member 20 is inserted into the first slot 35A and the second slot 35B with the first axial end 20X and the second axial end 20Y positioned parallel to the respective opposing side walls 36W and 37W. The inner member 20 is then rotated 90 degrees so that the first axial end 20X and the second axial end 20Y are positioned generally perpendicular to the respective opposing side walls 36W and 37W to retain the inner member 20 in the interior area 31 of the outer member 30. Removal of the inner member 20 for the outer member 30 is done by reversing the foregoing installation steps. Thus, the inner member 20 is removably disposed in the interior area 31 of the outer member 30 through the slot 35.

In some embodiments, the inner member 20 is manufactured from a composite material such as a thermoplastic material having solid or liquid lubricant additives therein. In some embodiments, the inner member 20 is manufactured from a self-lubricating material such as polytetrafluoroethylene (PTFE) with a fiber or fabric reinforcing structure or a molded PTFE structure. The outer member 30 is manufactured from a metallic material such as ASTM 52100 bearing steel or a stainless steel alloy.

Figure 6:
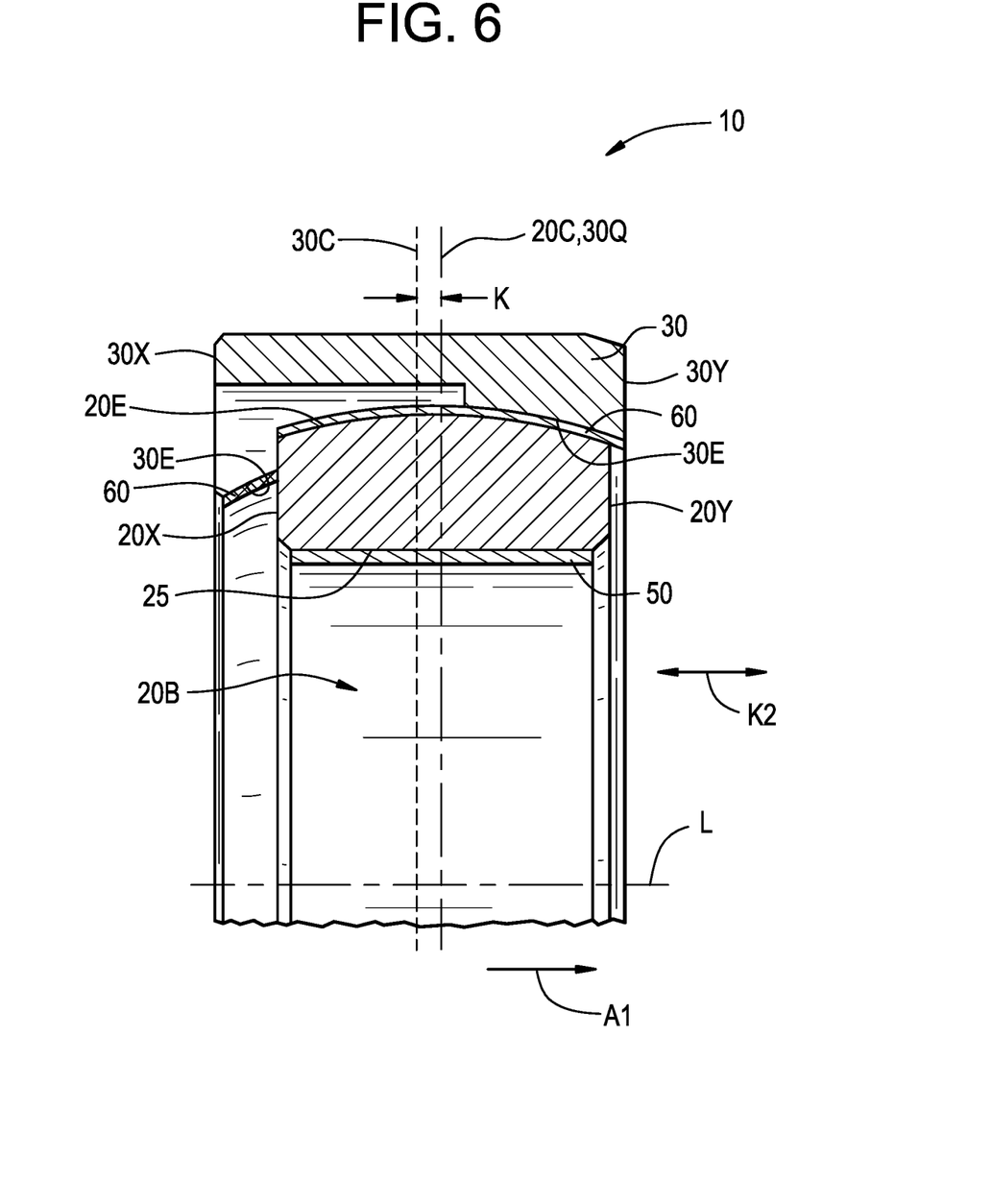
FIG. 6 is a cross sectional view of the spherical bearing of the present invention including lubricious liners.
Figure 8:
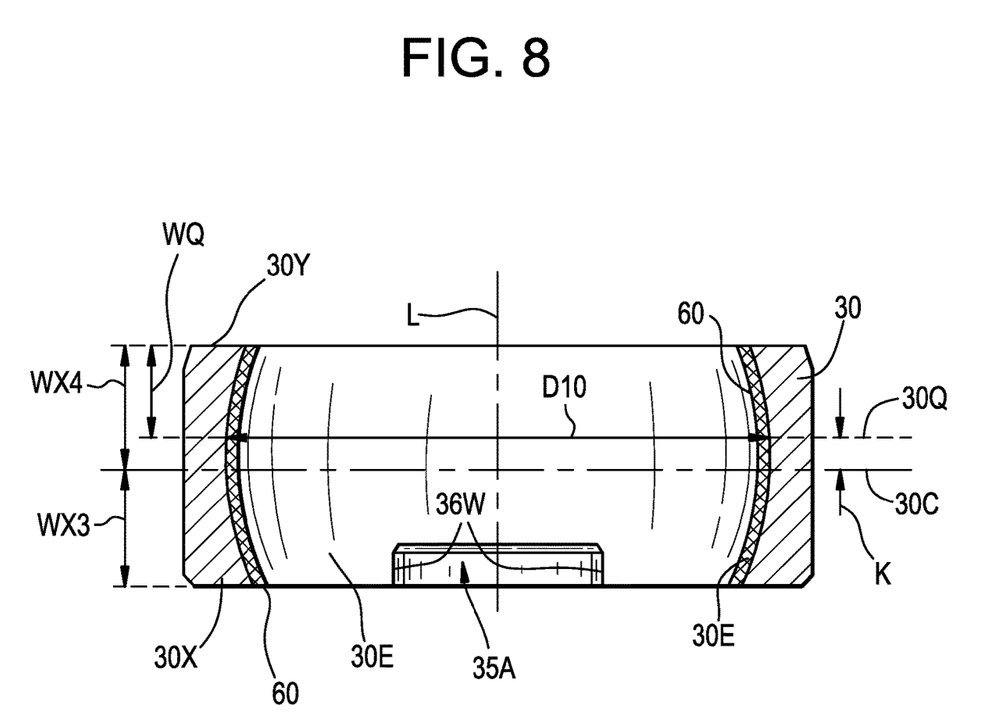
FIG. 8 is a cross sectional view of the outer member of spherical bearing of FIG. 6 shown with the lubricious liner.

As shown in FIGS. 6 and 8, the spherical bearing 10 includes a first lubricious liner 60 secured to (e.g., bonded or adhered to) the spherical inner surface 30E. The lubricious liner 60 slidingly engages the spherical exterior surface 20E of the inner member 20. The first lubricious liner 60 is manufactured from a PTFE material with a fiber or fabric reinforcing structure or a molded PTFE structure. While the lubricious liner 60 is shown and described as being secured to the spherical inner surface 30E, the present invention is not limited in this regard as other configurations may be employed including having the lubricious liner 60 secured to the spherical exterior surface 20E of the inner member 20 and slidingly engaging the spherical inner surface 30E of the outer member 30.

As shown in FIGS. 1-4A and 6, the inner member 20 has a bore 20B (e.g., a cylindrical bore) extending axially therethrough from the first axial end 20X to the second axial end 20Y. The bore 20B defines an inner bearing surface 25. As shown in FIG. 6, a second lubricious liner 50 is secured to the inner bearing surface 25. The second lubricious liner 50 is manufactured from a PTFE material with a fiber or fabric reinforcing structure or a molded PTFE structure.

As shown in FIG. 5, a shaft 70 extends into the bore 20B. The shaft 70 is in axial and rotational sliding engagement with the inner bearing surface 25.

When the lubricious liner 50 (see FIG. 6) is secured to the inner bearing surface and the shaft 70 extends into the bore 20B, the shaft 70 is in axial (e.g., in the direction of the arrow K2 shown in FIG. 6) and rotational (e.g., twisting) sliding engagement with the second lubricious liner 50.

Figure 7:
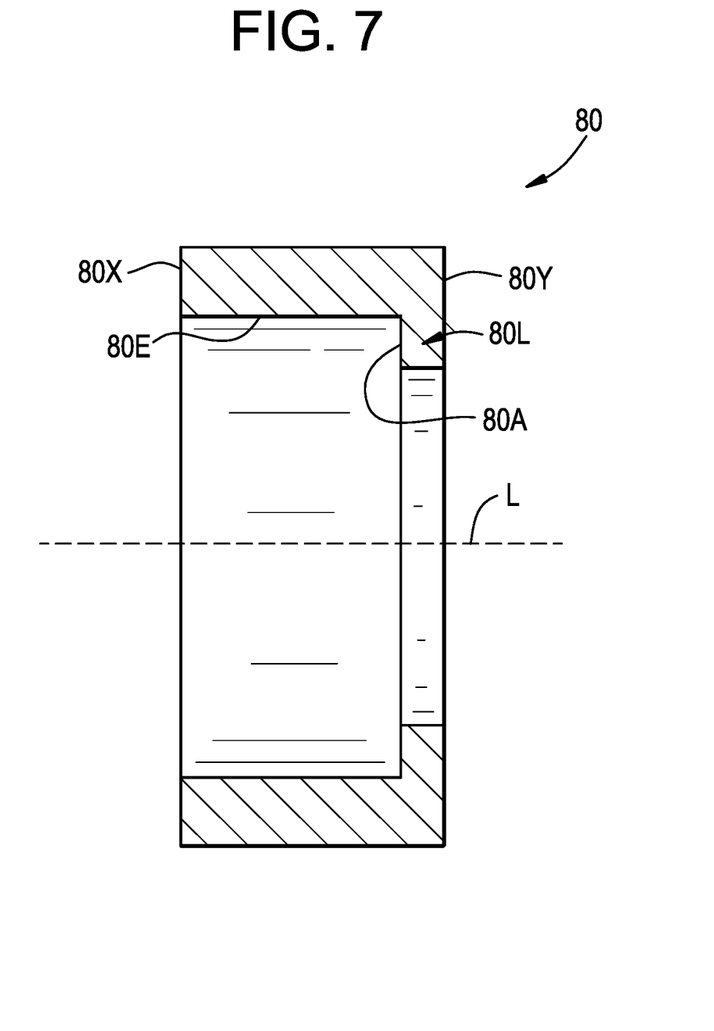
FIG. 7 is an enlarged cross section view of the housing of FIG. 5 shown without the bearing and shaft.

As shown in FIG. 5, the spherical bearing 10 is installed in a housing 80. As shown in FIGS. 5 and 7 the housing 80 is generally annular and extends from a bearing receiving end 80X to a bearing retaining end 80Y thereof. The housing 80 has a bearing receiving surface 80E extending axially inward from the bearing receiving end 80X. The bearing receiving surface 80E faces radially inward toward the longitudinal axis L. The bearing receiving surface 80E terminates at an abutment surface 80A that faces axially toward the bearing receiving end 80X. The abutment surface 80A is formed on a lip 80L that extends radially inward from the housing 80 proximate the bearing retaining end 80Y.

As shown in FIG. 5, the spherical bearing 10 is positioned in the housing 80 such that the retaining end 30Y of the outer member 30 engages the abutment surface 80A and the receiving end 30X of the outer member 30 is coplanar with the bearing receiving end 80X of the housing 80. The second axial end 20Y of the inner member 20 is located entirely in the housing 80 and axially inward from the bearing retaining end 80Y of the housing 80 when the inner member 20 is angularly misaligned relative to the outer member 30 at angles α up to 7 degrees measured relative to the longitudinal axis L.

As shown in FIG. 5, the shaft 70 extends from a first axial shaft end 70X to a second axial shaft end 70Y. The first axial shaft end 70X is configured to be secured to a first rail car (not shown) and the second axial shaft end 70Y is configured to be secured to a second rail car (not shown) such that the shaft 70 connects the first rail car to the second rail car leaving a space therebetween. A railcar gangway platform (not shown) is moveably secured to the housing 80, for example secured to an exterior surface 80R of the housing. The railcar gangway platform is a flexible connector/passageway fitted in the space between the first and second rail cars allowing passengers to move between the first and second rail cars. The first and second rail cars pivot (e.g., vertically, horizontally and combinations thereof) and move (e.g., axially move) relative to one another as the first and second rail cars travel along a track.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A spherical bearing comprising:
an inner member arranged concentrically about a longitudinal axis thereof and having a spherical exterior surface facing radially outward away from the longitudinal axis and extending a first width between a first axial end and a second axial end thereof, the inner member having an inner member central plane located equidistant between the first axial end and the second axial end;

an outer member having a spherical inner surface facing radially inward towards the longitudinal axis and extending a second width between a receiving end and a retaining end thereof, the outer member having an outer member central plane located equidistant between the receiving end and the retaining end, the spherical inner surface defining an interior area and having a maximum inside diameter located at an apex plane, the inner member being disposed in the interior area of the outer member between the receiving end and the retaining end when the inner member is aligned relative to the outer member at a zero angle measured relative to the longitudinal axis;

the inner member central plane being coplanar with the apex plane and being axially offset from the outer member central plane towards the retaining end when the inner member is aligned relative to the outer member at the zero angle measured relative to the longitudinal axis; and the first axial end of the inner member being located entirely in the interior area and axially inward from the receiving end when the inner member is angularly misaligned relative to the outer member at a non-zero angle measured relative to the longitudinal axis, wherein the spherical inner surface has:
(a) a first slot formed therein, the first slot extending radially outward from the spherical inner surface away from the longitudinal axis and extending axially inward from the receiving end toward the retaining end and axially terminating between the outer member apex plane and the retaining end, and the first slot having a circumferential width that is greater than the first width of the inner member; and
(b) a second slot formed therein, the second slot extending radially outward from the spherical inner surface away from the longitudinal axis and extending axially inward from the receiving end toward the retaining end and axially terminating between the outer member apex plane and the retaining end, and the second slot having the same circumferential width as the first slot, the second slot being located opposite the first slot.

2. The spherical bearing of claim 1, wherein the non-zero angle is up to 7 degrees.

3. The spherical bearing of claim 1, wherein the inner member is removably disposed in the interior area of the outer member through the first slot and the second slot.

4. The spherical bearing of claim 1, wherein the inner member comprises a composite material and the outer member comprises a metallic material.

5. The spherical bearing of claim 1, wherein the spherical exterior surface slidingly engages the spherical inner surface.

6. The spherical bearing of claim 1, further comprising a first lubricious liner secured to the spherical inner surface, the first lubricious liner slidingly engaging the spherical outer surface of the inner member.

7. The spherical bearing of claim 6, wherein the inner member has a bore extending axially therethrough from the first axial end to the second axial end, the bore defining an inner bearing surface.

8. The spherical bearing of claim 7, further comprising a second lubricious liner secured to the inner bearing surface.

9. The spherical bearing of claim 8, further comprising a shaft extending into the bore, wherein the shaft is in at least one of axial and rotational sliding engagement with the second lubricious liner.

10. The spherical bearing of claim 7, further comprising a shaft extending into the bore.

11. The spherical bearing of claim 10, wherein the shaft is in at least one of axial and rotational sliding engagement with the inner bearing surface.

12. An assembly of a spherical bearing and a housing, the assembly comprising:
the housing extending axially from a housing receiving end to a housing retaining end thereof, the housing having a bearing receiving surface extending axially inward from the housing receiving end, the bearing receiving surface facing radially inward toward a longitudinal axis and terminating at an abutment surface that faces axially toward the housing receiving end, the and the abutment surface being formed on a lip extending radially inward from the housing proximate the retaining end;
the spherical bearing comprising an inner member arranged concentrically about the longitudinal axis thereof and having a spherical exterior surface facing radially outward away from the longitudinal axis and extending a first width between a first axial end and a second axial end thereof, the inner member having an inner member central plane located equidistant between the first axial end and the second axial end;
an outer member having a spherical inner surface facing radially inward towards the longitudinal axis and extending a second width between a receiving end and a retaining end thereof, the outer member having an outer member central plane located equidistant between the receiving end and the retaining end, the spherical inner surface defining an interior area and having a maximum inside diameter located at an apex plane, the inner member being disposed in the interior area of the outer member between the receiving end and the retaining end when the inner member is aligned relative to the outer member at the zero angle measured relative to the longitudinal axis;
the inner member central plane being coplanar with the apex plane and being axially offset from the outer member central plane towards the retaining end when the inner member is aligned relative to the outer member at a zero angle measured relative to the longitudinal axis;
the first axial end of the inner member being located entirely in the interior area and axially inward from the receiving end when the inner member is angularly misaligned relative to the outer member at a non-zero angle measured relative to the longitudinal axis;
the spherical bearing being positioned in the housing such that the retaining end of the outer member engages the abutment surface and the receiving end of the outer member is coplanar with the bearing receiving end of the housing; and
the second axial end of the inner member being located entirely in the housing and axially inward from the bearing retaining end of the housing when the inner member is angularly misaligned relative to the outer member at the non-zero angle measured relative to the longitudinal axis.

13. The assembly of claim 12, wherein the non-zero angle is up to 7 degrees.

14. The assembly of claim 12, wherein the spherical inner surface has:
    (a) a first slot formed therein, the first slot extending radially outward from the spherical inner surface away from the longitudinal axis and extending axially inward from the receiving end toward the retaining end and axially terminating between the outer member apex plane and the retaining end, and the first slot having a circumferential width that is greater than the first width of the inner member; and
    (b) a second slot formed therein, the second slot extending radially outward from the spherical inner surface away from the longitudinal axis and extending axially inward from the receiving end toward the retaining end and axially terminating between the outer member apex plane and the retaining end, and the second slot having the same circumferential width as the first slot, the second slot being located opposite the first slot.

15. The assembly of claim 14, wherein the inner member is removably disposed in the interior area of the outer member through the first slot and the second.

16. The assembly of claim 12, wherein the inner member comprises a composite material and the outer member comprises a metallic material.

17. The assembly of claim 12, wherein the spherical exterior surface slidingly engages the spherical inner surface.

18. The assembly of claim 12, further comprising a first lubricious liner secured to the spherical inner surface, the first lubricious liner slidingly engaging the spherical outer surface of the inner member.

19. The assembly of claim 18, wherein the inner member has a bore extending axially therethrough from the first axial end to the second axial end, the bore defining an inner bearing surface.

20. The assembly of claim 19, further comprising a second lubricious liner secured to the inner bearing surface.

21. The assembly of claim 20, further comprising a shaft extending into the bore, wherein the shaft is in at least one of axial and rotational sliding engagement with the second lubricious liner.

22. The assembly of claim 19, further comprising a shaft extending into the bore.

23. The assembly of claim 22, wherein the shaft is in at least one of axial and rotational sliding engagement with the inner bearing surface.

* * * * *